UNITED STATES PATENT OFFICE.

HENRY A. KOHMAN, ROY IRVIN, AND ROBERT J. CROSS, OF PITTSBURGH, PENNSYLVANIA, ASSIGNORS TO THE WARD BAKING COMPANY, OF NEW YORK, N. Y., A CORPORATION OF NEW YORK.

MANUFACTURE OF LEAVENED BREAD.

1,325,327.  Specification of Letters Patent.  Patented Dec. 16, 1919.

No Drawing.    Application filed February 11, 1919.   Serial No. 276,352.

*To all whom it may concern:*

Be it known that we, HENRY A. KOHMAN, ROY IRVIN, and ROBERT J. CROSS, all citizens of the United States, and all residing in Pittsburgh, Allegheny county, State of Pennsylvania, have invented certain new and useful Improvements in the Manufacture of Leavened Bread; and we do hereby declare the following to be a full, clear, and exact description of the invention, such as will enable others skilled in the art to which it appertains to make and use the same.

In Letters Patent of the United States, No. 1,151,526 dated August 24, 1915, there is described the employment of a composition comprising an ammonium salt, a calcium salt, and an oxidizing salt (potassium bromate) with or without sodium chlorid as a yeast saver and maturing agent in the maturing of leavened bread. These ingredients, together with a suitable vehicle are added to the dough batch in a manner now well understood in the art, and for the general purposes set forth in other U. S. patents relating to the manufacture of bread, as, for instance Nos. 1,148,328 and 1,148,329 dated July 27th, 1915, and Nos. 1,158,933 and 1,158,934, dated November 2, 1915, wherein are set forth the characteristic advantages of using in the manufacture of leavened bread, the several ingredients above referred to, singly and in various combinations.

In the employment of these yeast-saving and dough-maturing substances, and, more particularly, in the use of those in which the dough-maturing characteristic is especially marked, (as, for instance, potassium bromate and similar oxidizing salts having dough-maturing properties) it is of disadvantage to permit an over-aging of the dough. This is well understood, but cannot, in all cases, be ordinarily avoided, because of the exigencies and contingencies of the bread manufacture as a whole, which occasionally delay its completion within the period normally intended for the termination of the final stage of the so-called proofing operation immediately prior to the baking of the loaves.

So also, the almost inevitable differences in temperature met with at different seasons of the year and in different bakeries introduce a corresponding element of irregularity interfering more or less with the desired normal or standard practice.

In those instances, where, by reason of the contingencies referred to, the dough is over-aged, it has a tendency, more or less marked, to bind or to lose in part its elasticity, and the degree of expansion desired in the finished loaf.

The purpose of the present invention is to make the manufacture more elastic by providing as an additional element in the composition of the dough, an ingredient which will permit a notable extension of the normal dough fermentation period without material danger of over-maturing of the dough. Thus, we have found that by adding to the dough batch an appropriate quantity of a meal-like product containing diastatic and proteolytic enzyms produced by the action of an enzym-producing fungus upon starchy and protein surfaces, (particularly, a meal-like product containing such enzyms produced by the action of an enzym-producing fungus, such as the *Aspergillus oryzæ* upon Indian corn, or the like) the period of fermentation of the dough batch may suffer considerable extension without the occurrence of material over-maturing of the dough; so also, conversely, in the use of the meal-like product as an ingredient of the dough batch, any tendency which it has to cause the dough to run, to become sticky or to flatten out, and to take on a coarse texture in the finished loaf is itself counteracted by the stiffening attributes of salts and particularly by reason of the maturing effect of the oxidizing ingredient or ingredients added, such as the potassium bromate hereinbefore referred to.

The meal-like product which we have principally employed in carrying out our invention is the product obtained by the action of the *Aspergillus oryzæ* upon Indian corn or maize, made in accordance with the process described in U. S. Patent No. 1,274,898 dated August 6, 1918. In the preferred practice of our invention, for every 100 pounds of flour used in the dough batch, we employ one-half pound of the meal-like product and one-half pound of a composition made up, by weight, say of ten parts of ammonium chlorid, 25 parts of calcium sulfate, .3 parts of potassium bromate, 25 parts of sodium chlorid and 40 parts of flour. Instead of using flour as the vehicle in making up the composition just referred to, the meal-like product may be employed as the vehicle for the salts; in that event a like quantity of the meal-like product may be substracted from the one-half pound thereof above referred to. Or, instead of the flour, the entire one-half pound of meal-like product may be incorporated with the mineral salts so as to make up a single composition to be added as such to each 100 pounds of flour to the dough batch.

It will, of course, be understood that instead of employing a meal-like product made by the action of the *Aspergillus oryzæ* upon Indian corn or maize, it will be feasible to employ, with generally similar results, a meal-like product containing diastatic and proteolytic enzyms obtained by the action of any suitable fungus upon Indian corn or upon any other suitable material, or even to employ an extract containing said enzyms and obtained by the action of a suitable fungus upon such material.

We may state further, that, in some instances, we may omit the calcium and ammonium salts and combine with the solution-product or with the meal-like product containing the fungus-produced enzyms referred to,—potassium bromate or other like oxidizing agents having a maturing effect upon the dough.

Having thus described our invention, what we claim is:

1. The method of making leavened bread, which comprises adding to the yeast, flour and other ingredients of the dough batch, yeast-saving and dough-maturing salts, together with a product containing diastatic and proteolytic enzyms produced by the action of a fungus upon carbohydrate and protein substances; substantially as described.

2. The method of making leavened bread, which comprises adding to the yeast, flour and other ingredients of the dough batch, yeast-saving and dough-maturing salts, together with a meal-like product containing diastatic and proteolytic enzyms produced by the action of a fungus upon carbohydrate and protein substances; substantially as described.

3. The method of making leavened bread, which comprises adding to the yeast, flour and other ingredients of the dough batch, a dough-maturing oxidizing agent, together with a product containing diastatic and proteolytic enzyms produced by the action of a fungus upon carbohydrate and protein substances; substantially as described.

4. The method of making leavened bread, which comprises adding to the yeast, flour and other ingredients of the dough batch, potassium bromate, together with a product containing diastatic and proteolytic enzyms produced by the action of a fungus upon carbohydrate and protein substances; substantially as described.

5. The method of making leavened bread, which comprises adding to the yeast, flour and other ingredients of the dough batch, potassium bromate, a suitable calcium salt, and a suitable ammonium salt, together with a product containing diastatic and proteolytic enzyms produced by the action of a fungus upon carbohydrate and protein substances; substantially as described.

HENRY A. KOHMAN.
ROY IRVIN.
ROBERT J. CROSS